(12) United States Patent
Camarillo Garvia et al.

(10) Patent No.: US 11,658,847 B2
(45) Date of Patent: May 23, 2023

(54) PACKET COMMUNICATIONS PROVIDING PACKET PROCESSING EFFICIENCIES IN A NETWORK INCLUDING USING A SEGMENT ROUTING AND TUNNEL EXCHANGE

(71) Applicant: CISCO TECHNOLOGY, INC., San Jose, CA (US)

(72) Inventors: Pablo Camarillo Garvia, Madrid (ES); Hendrikus G. P. Bosch, Aalsmeer (NL); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/937,961

(22) Filed: Oct. 4, 2022

(65) Prior Publication Data

US 2023/0026874 A1    Jan. 26, 2023

Related U.S. Application Data

(63) Continuation of application No. 16/821,965, filed on Mar. 17, 2020, which is a continuation of application
(Continued)

(51) Int. Cl.
*H04L 12/46* (2006.01)
*H04L 45/74* (2022.01)
(Continued)

(52) U.S. Cl.
CPC .......... *H04L 12/4633* (2013.01); *H04L 45/74* (2013.01); *H04L 45/50* (2013.01); *H04L 2212/00* (2013.01); *H04W 84/042* (2013.01)

(58) Field of Classification Search
CPC ..... H04L 12/4633; H04L 45/74; H04L 45/50; H04L 2212/00; H04W 84/042
See application file for complete search history.

(56) References Cited

U.S. PATENT DOCUMENTS 8,041,824 B1* 10/2011 Maeng .................... H04L 63/10
709/229
8,867,526 B2   10/2014 Qiu et al.
(Continued)

OTHER PUBLICATIONS

Filsfls et al., "SRv6 Network Programming," draft-filsfils-spring-srv6-network-programming-04, Mar. 4, 2018, The ntemet Society, Reston, VA, USA (fifty-seven pages).
(Continued)

*Primary Examiner* — Harry H Kim
(74) *Attorney, Agent, or Firm* — Polsinelli

(57) ABSTRACT

In one embodiment, a segment routing and tunnel exchange provides packet forwarding efficiencies in a network, including providing an exchange between a segment routing domain and a packet tunnel domain. One application includes the segment routing and tunnel exchange interfacing segment routing packet forwarding (e.g., in a Evolved Packet Core (EPC) and/or 5-G user plane) and packet tunnel forwarding in access networks (e.g., replacing a portion of a tunnel between an access node and a user plane function for accessing a corresponding data network). In one embodiment, a network provides mobility services using a segment routing data plane that spans segment routing and tunnel exchange(s) and segment routing-enabled user plane functions. One embodiment uses the segment routing data plane without any modification to a (radio) access network (R)AN (e.g., Evolved NodeB, Next Generation NodeB) nor to user equipment (e.g., any end user device).

20 Claims, 10 Drawing Sheets

Related U.S. Application Data

No. 15/925,731, filed on Mar. 19, 2018, now Pat. No. 10,594,513.

(51) Int. Cl.
*H04L 45/50* (2022.01)
*H04W 84/04* (2009.01)

(56) References Cited

U.S. PATENT DOCUMENTS

| | | | |
|---|---|---|---|
| 9,537,769 | B2 | 1/2017 | Bryant et al. |
| 9,762,488 | B2 | 9/2017 | Previdi et al. |
| 10,063,475 | B2 | 8/2018 | Previdi et al. |
| 10,243,847 | B2 | 3/2019 | Previdi et al. |
| 10,382,334 | B2 | 8/2019 | Previdi et al. |
| 10,419,982 | B1 | 9/2019 | Gundavelli et al. |
| 10,652,133 | B1 * | 5/2020 | Morris .................. H04L 45/745 |
| 2008/0310344 | A1 * | 12/2008 | Krishnan .............. H04W 28/06 370/328 |
| 2012/0177004 | A1 | 7/2012 | Yano et al. |
| 2013/0258963 | A1 | 10/2013 | Mihaly et al. |
| 2015/0109902 | A1 * | 4/2015 | Kumar .................... H04L 45/22 370/219 |
| 2015/0256456 | A1 | 9/2015 | Previdi et al. |
| 2016/0277294 | A1 | 9/2016 | Akiyoshi |
| 2016/0330045 | A1 | 11/2016 | Tang et al. |
| 2016/0366052 | A1 | 12/2016 | Chapman et al. |
| 2017/0064717 | A1 * | 3/2017 | Filsfils .................... H04L 45/50 |
| 2017/0237656 | A1 | 8/2017 | Gage |
| 2017/0250908 | A1 | 8/2017 | Nainar et al. |
| 2017/0317929 | A1 * | 11/2017 | Chen ........................ H04L 45/04 |
| 2018/0077051 | A1 | 3/2018 | Nainar et al. |
| 2018/0241671 | A1 | 8/2018 | Bosch et al. |

OTHER PUBLICATIONS

Filsfls et al., "Segment Routing Architecture," draft-iell-spring-segment-routing-15, Jan. 25, 2018, The Internet Society, Reston, VA, USA (thirty-one pages).

Previdi et al., "IPv6 Segment Routing Header (SRH)," draft-ietf-6man-segment-routing-header-10, Mar. 17, 2018, The Internet Society, Reston, VA, USA (thirty-three pages).

Rekhter et al., "A Border Gateway Protocol 4 (BGP-4)," RFC 4271, Jan. 2006, The Internet Society, Reston, VA, USA (104 pages).

Bates et al., "Multiprotocol Extensions for BGP-4," RFC 2283, Feb. 1998, The Internet Society, Reston, VA, USA (nine pages).

Deering et al., "Internet Protocol, Version 6 (IPv6) Specification," RFC 2460, Dec. 1998, The Internet Society, Reston, VA, USA (thirty-nine pages).

S. Deering and R. Hinden, "Internet Protocol, Version 6 (IPv6) Specification," RFC 8200, Jul. 2017, The Internet Society, Reston, VA, USA (forty-two pages).

T. Bates et al., "Multiprotocol Extensions for BGP-4," RFC 4760, Jan. 2007, The Internet Society, Reston, VA, USA (twelve pages).

Rosen et al., "Multiprotocol Label Switching Architecture," RFC 3031, Jan. 2001, The Internet Society, Reston, VA, USA (sixty-one pages).

"Information technology—Telecommunications and information exchange between systems—Intermediate System to Intermediate System intra-domain routing information exchange protocol for use in conjunction with the protocol for providing the connectionless-mode network service (ISO 8473)," Second Edition, Nov. 15, 2002, ISO/IEC 2002, Switzerland (210 pages).

S. Matsushima et al., "Segment Routing IPv6 for Mobile User Plane," draft-ieff-dmm-srv6-mobile-uplane-01, Mar. 5, 2018, The Internet Society, Reston, VA, USA (twenty-three pages).

CJ Bernardos et al, "A PMIPv6-based solution for Distributed Mobility Management," draft-bernardos-dmm-pmip-09, Sep. 8, 2017, The Internet Society, Reston, VA, USA (twenty pages).

CJ Bernardos et al, "Proxy Mobile IPv6 extensions for Distributed Mobility Management," draft-bernardos-dmmpmipv6-dlif-01, Mar. 2, 2018, The Internet Society, Reston, VA, USA (thirty-two pages).

"General Packet Radio Service (GPRS) enhancements for Evolved Universal Terrestrial Radio Access Network (E-UTRAN) access (Release 15)," 3GPP Technical Specification 23.401, V15.2.0, Dec. 2017, 3GPP Mobile Competence Centre, Sophia Antipolis Cedex, France (404 pages).

"Architecture enhancements for non-3GPP accesses (Release 15)," 3GPP Technical Specification 23.402, V15.2.0, Dec. 2017, 3GPP Mobile Competence Centre, Sophia Antipolis Cedex, France (314 pages).

"System Architecture for the 5G System; Stage 2 (Release 15)," 3GPP Technical Specification 23.501, V15.0.0, Dec. 2017, 3GPP Mobile Competence Centre, Sophia Antipolis Cedex, France (181 pages).

"Procedures for the 5G System; Stage 2 (Release 15)," 3GPP Technical Specification 23.502, V15.0.0, Dec. 2017, 3GPP Mobile Competence Centre, Sophia Antipolis Cedex, France (251 pages).

"Policy and Charging Control Framework for the 5G System; Stage 2 (Release 15)," 3GPP Technical Specification 23.503, V15.0.0, Dec. 2017, 3GPP Mobile Competence Centre, Sophia Antipolis Cedex, France (fifty-six pages).

S. Matsushima et al., "Segment Routing IPv6 for Mobile User-Plane," draft-ieff-dmm-srv6-mobile-uplane-00, Nov. 30, 2017, The Internet Society, Reston, VA, USA (twenty pages).

Pablo Camarillo, "[DMM] SRv6 for Mobile User-Plane," https://www.mail-archive.com/dmm@ieff.org/msg02740.html, Feb. 26, 2018, The Internet Society, Reston, VA, USA (four pages).

Abdelsalam et al., "Implementation of Virtual Network Function Chaining through Segment Routing in a Linuxbased NFV Infrastructure," arXiv.org, Apr. 20, 2017, XP055505386, DOI: arXiv:1702.05157v4, Cornell University Library, Ithaca, NY (ten pages).

* cited by examiner

PACKET COMMUNICATIONS PROVIDING PACKET PROCESSING EFFICIENCIES IN A NETWORK INCLUDING USING A SEGMENT ROUTING AND TUNNEL EXCHANGE

CROSS-REFERENCE TO RELATED APPLICATIONS

This application is a continuation of U.S. patent application Ser. No. 16/821,965, filed on Mar. 17, 2022, which in turn, is a continuation of U.S. patent application Ser. No. 15/925,731, filed Mar. 19, 2018, which are expressly incorporated by reference in their entirety.

TECHNICAL FIELD

The present disclosure relates generally to sending of packets through a packet network, such as, but not limited to, using a segment routing and tunnel exchange.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, an approach taken by many communications providers is to use packet switching technology. Packets are typically forwarded in a network based one or more values representing network nodes or paths.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
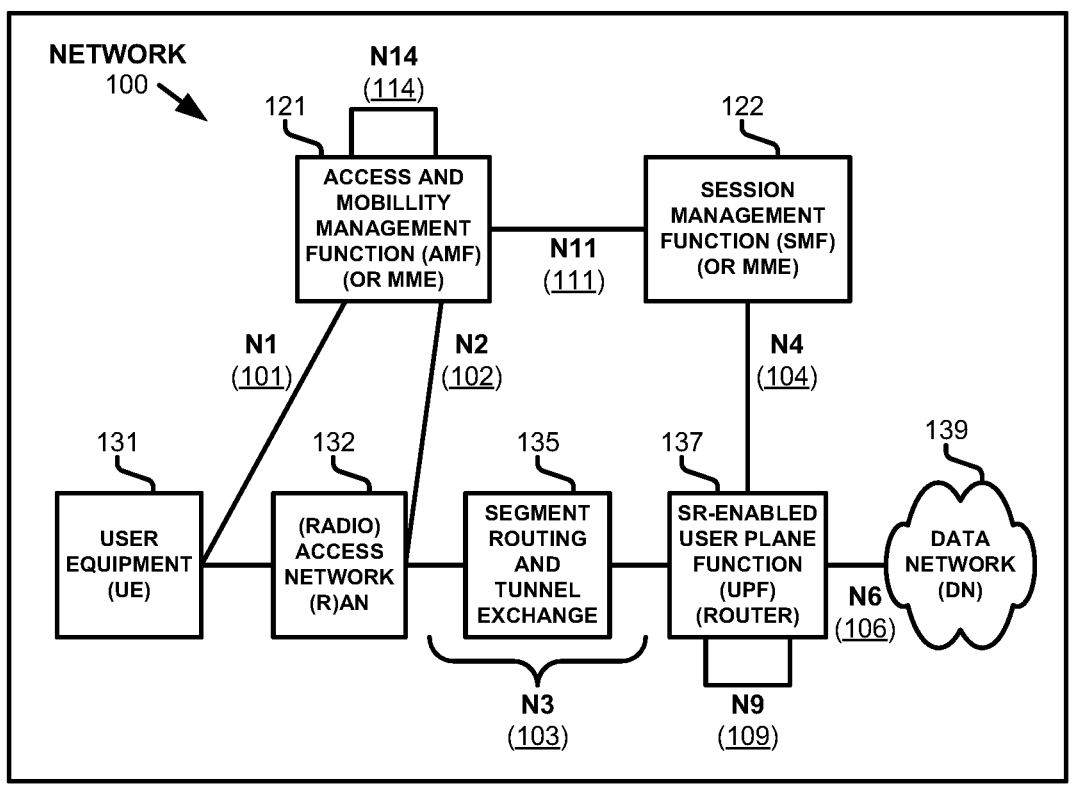
FIG. 1A illustrates a network operating according to one embodiment.

Disclosed are, inter alia, methods, apparatus, computer-storage media, mechanisms, and means associated with packet communications including using a segment routing and tunnel exchange in a mobility network.

One embodiment includes a method, comprising: receiving, by a segment routing and tunnel exchange network node, a specific segment routing packet communicated via a network, with the specific segment routing packet including a segment routing header comprising an encoding of specific tunnel information in a segment list, and with a specific packet being transported within the specific segment routing packet; obtaining, by the segment routing and tunnel exchange network node, said specific tunnel information from said received specific segment routing packet, with said specific tunnel information including a tunnel endpoint identifier and a specific tunnel IP address; encapsulating, by the segment routing and tunnel exchange network node, the specific packet in a specific Internet Protocol (IP) tunnel packet including said obtained specific tunnel information in an IP header of the IP tunnel packet; and sending the specific IP tunnel packet into the network from the segment routing and tunnel exchange network node.

In one embodiment, the segment list includes a first specific segment identifier comprising the tunnel endpoint identifier; and wherein the segment list includes a second specific segment identifier comprising the specific tunnel IP address. In one embodiment, the first specific segment identifier is an address of the segment routing and tunnel exchange network node. In one embodiment, the function portion of the first specific segment identifier specifies an exchange segment routing function; wherein an argument portion of the first specific segment identifier includes the tunnel endpoint identifier; and wherein the segment routing and tunnel exchange network node operates according to the exchange segment routing function in said obtaining specific tunnel information and said encapsulating the specific packet in the specific IP tunnel packet including said obtained specific tunnel information. In one embodiment, a destination address in the IP header of the specific IP tunnel packet includes the specific tunnel IP address. In one embodiment, the specific tunnel IP address is an address of a radio access node (RAN) in the network.

One embodiment includes, receiving, by the segment routing and tunnel exchange network node, a particular tunnel packet communicated via the network, with the particular tunnel packet including a particular packet encapsulated therein, with the particular tunnel packet including one or more headers comprising the particular tunnel endpoint identifier and a particular Internet Protocol (IP) destination address of the segment routing and tunnel exchange network node; responsive to the particular IP destination address of said received particular tunnel packet, the segment routing and tunnel exchange network node operating according to an uplink segment routing function including to generate a particular segment routing packet including a segment list including one or more segment identifiers reflecting a particular segment routing policy for the particular segment routing packet; and sending the particular segment routing packet into the network from the segment routing and tunnel exchange network node.

One embodiment includes a method, comprising: generating, by a network node in a network, a specific segment routing packet, with the specific segment routing packet including a particular segment identifier, with a specific packet being transported within the specific segment routing packet, and with the particular segment identifier being an address of a segment routing and tunnel exchange network node and including an identification of a specific segment routing function and a tunnel endpoint identifier; sending the specific segment routing packet into the network from the network node; receiving the specific segment routing packet by the segment routing and tunnel exchange network node, with an Internet Protocol (IP) destination address of said received specific segment routing packet being the particular segment identifier; responsive to the particular segment identifier of said received specific segment routing packet, the segment routing and tunnel exchange network node operating according to the specific segment routing function that includes: generating a specific tunnel packet comprising the specific packet encapsulated therein and a header that includes the tunnel endpoint identifier obtained from the particular segment identifier; and sending the specific tunnel packet from the segment routing and tunnel exchange network node.

In one embodiment, said generated specific segment routing packet comprises a segment routing header including a segment list that includes a second segment identifier comprising the specific tunnel IP address; and wherein said generating the specific tunnel packet comprises setting the IP destination address of the specific tunnel packet to the specific tunnel IP address.

2. Description

Disclosed are, inter alia, methods, apparatus, computer-storage media, mechanisms, and means associated with packet communications including using a segment routing and tunnel exchange in a network. In one embodiment, the segment routing and tunnel exchange interfaces segment routing packet forwarding (e.g., in a Evolved Packet Core (EPC) and/or 5-G user plane) and packet tunnel forwarding in access networks (e.g., replacing a portion of a tunnel between an access node and an edge network node/edge user plane function/PDN Gateway) for accessing a corresponding data network).

As used herein, "User Plane Function" ("UPF") refers to a mobility network node that communicates packets in a data plane of a core network, with the core network communicatively coupling radio and non-radio access networks or (R)ANs (e.g., that communicate with user equipment) and data networks (e.g., operator services, Internet access, third-party services). As used herein, "Session Management Function" ("SMF") or "Mobility Management Entity" ("MME") refers to a mobility network node that performs control plane functionality related to subscriber sessions (e.g., session establishment, modification, and release), or otherwise described herein. As used herein, "Assess and Mobility Management Function" ("AMF") or "Mobility Management Entity" ("MME") refers to a mobility network node that performs control plane functionality related to registration management, connection management, reachability management, and/or security and access management and authorization, or otherwise described herein.

As used herein segment routing includes using Internet Protocol Version 4 and/or 6 (IPv4 and/or IPv6) addresses as segment identifiers (SIDs). Further, segment routing includes IPv6 SR (SRv6) and/or IPv4 (SRv4). The terms "node" or "network node" are used herein to refer to a router or host. The term "route" is used herein to refer to a fully or partially expanded prefix/route (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix. Also, as used herein, "forwarding information" includes, but is not limited to, information describing how to process (e.g., forward, send, manipulate, modify, change, drop, copy, duplicate, receive) corresponding packets. In one embodiment, determining forwarding information is performed via an ingress lookup operation and an egress lookup operation. Also, the term "processing" when referring to processing of a packet process refers to a broad scope of operations performed in response to a packet, such as, but not limited to, forwarding/sending, dropping, manipulating/modifying/changing, receiving, duplicating, creating, applying one or more service or application functions to the packet or to the packet switching device (e.g., updating information), etc. Also, as used herein, the term processing in "parallel" is used in the general sense that at least a portion of two or more operations are performed overlapping in time.

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote distinct units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

In one embodiment, a network includes a particular network node (e.g., router, user plane function) and a segment routing and tunnel exchange. The particular network node receives a specific packet and encapsulates it in a specific packet. The segment routing header includes a specific segment routing policy that includes an encoding of specific tunnel information. The specific segment routing packet is sent from the particular network node. The segment routing and tunnel exchange receives the specific segment routing packet and obtains therefrom. The specific packet is encapsulated in a specific Internet Protocol (IP) tunnel packet the obtained specific tunnel information included in a header of the IP tunnel packet, which is sent from the segment routing and tunnel exchange, such as, but not limited to, an access node of an access network (e.g., a radio access network).

In one embodiment, a segment routing and tunnel exchange receives a particular Internet Protocol (IP) tunnel packet including a particular packet encapsulated therein. Packet classification is performed on the particular IP tunnel packet resulting in the identification of a particular segment routing policy to reach a particular network node (e.g., that would otherwise terminate the IP tunnel). The particular packet is encapsulated in a particular segment routing packet that includes ordered segment identifiers (e.g., in segment list(s) of segment routing header(s)). The particular segment routing packet is steered through the network, that includes one or more segment routing-enabled network nodes, with the particular segment routing packet being delivered to the particular network node. According to a particular segment routing function of the particular segment routing policy, the particular network node decapsulates the particular packet, which is sent from the particular network node (e.g., to a data network).

In one embodiment, a specific packet is received by a particular network node from a data network. The particular network node generates a specific segment routing packet that comprises the specific packet encapsulated therein and a segment routing header. The segment routing header includes a segment list comprising a plurality of segment identifiers that includes a first particular segment identifier and a second particular segment identifier. The first particular segment identifier is an address of a segment routing and tunnel exchange, with the particular segment identifier including an identification of a downlink segment routing function and a tunnel endpoint identifier. The second particular segment identifier includes a specific address of an access node. The specific segment routing packet is sent from the particular network node and received by the segment routing and tunnel exchange. In response, the segment routing and tunnel exchange operates according to (e.g., invokes) the downlink segment routing function that includes generating a specific tunnel packet with the specific packet encapsulated therein. The specific tunnel packet also includes one or more headers that comprise a destination address of the specific address obtained from the second particular segment identifier and the tunnel endpoint identifier obtained from the first particular segment identifier. The specific tunnel packet is sent from the segment routing and tunnel exchange.

One embodiment applies Internet Protocol Version 6 (IPv6) Segment Routing (SRv6) to the Evolved Packet Core (EPC) and 5G user plane, without modifying the (Radio) Access Network or (R)AN. IPv6 segment routing (SRv6) uses an IPv6 Routing Extension Header, called Segment Routing Header (SRH), where each segment is encoded as an IPv6 address in an ordered Segment List. Segment Routing over the IPv6 data plane offers a network architecture where segment identifiers, or SRv6 SIDs, are associated with a network functions. A segment identifiers identifies both the location of the node hosting the function and the function itself (and possibly arguments). Hence, service chaining can be achieved by simply sequencing the segment identifiers associated to each service into a segment identifier list.

One embodiment applies Internet Protocol Version 6 (IPv6) Segment Routing (SRv6) to the Evolved Packet Core (EPC) and 5G user plane, without modifying the (Radio) Access Network or (R)AN. A segment routing and tunnel exchange (e.g., network node, router) provides a tunnel (e.g., GPRS Tunneling Protocol or "GTP") data plane interface to and from a (R)AN while providing a segment routing interface data plane to and from the core network. The segment routing and tunnel exchange transforms tunnel packets received from the (R)AN into segment routing packets sent to the core network; and transforms segment routing packets received from core network into tunnel packet sent to the (R)AN. In one embodiment, the segment routing and tunnel exchange operates according to segment routing functions in performing these packet transformations.

The control plane of the network (e.g., a Mobility Management Entity (MME), an Access and Mobility Management Function (AMF), a Session Management Function (SFM)) signals a (R)AN node the identification of a tunnel to use for particular traffic (with corresponding nodes in the network updated, as required, in response to a handover). In one embodiment, this identification is a Fully Qualified Tunnel End Point Identifier (FTEID), which includes a Tunnel Endpoint Identifier (TEID) and an IPv6 address. In one embodiment, this IPv6 address an address of the segment routing and tunnel exchange that will cause the transformation of a received tunnel packet to a segment routing packet that is sent into the core network. In one embodiment, this IPv6 address includes the identification of a segment routing function for performing the tunnel to segment routing packet transformation.

One embodiment communicates uplink packet traffic in the following manner. A particular packet is received from the User Equipment (UE) by a (R)AN node. The (R)AN node encapsulates the particular packet into an IPv6 tunnel packet, typically by adding respective User Datagram Protocol (UDP) and GTP headers. The IP destination address of the tunnel packet will be the signaled IPv6 address of segment routing and tunnel exchange, and the TEID in the GTP header will be the signaled TEID. The (R)AN node sends the tunnel packet into the network, and it is forwarded based on the tunnel packet's IP destination address. In one embodiment, the (R)AN is IPv6 capable, but not segment routing capable.

Based on the IPv6 destination address of a received tunnel packet, the segment routing and tunnel exchange operates according to a segment routing function to transform the tunnel packet into a segment routing packet. Based on this IP address, a corresponding segment routing policy (i.e., one or more segment identifiers) is retrieved from a data structure and added to one or more segment routing headers of the segment routing packet. In one embodiment, network functionalities (e.g., traffic engineering, service chaining, billing data collection, packet monitoring, lawful intercept, Quality of Service) are identified by segment identifiers of the segment routing policy. The segment routing packet is forwarded through the network according to the ordered segment identifiers of the segment routing policy, with corresponding segment routing functions being invoked on segment routing nodes. In one embodiment, a last segment identifier is an address of a network node in the core network that will decapsulate the original packet, and send into a packet data network (e.g., PDN, DN).

The control plane of the network (e.g., a Mobility Management Entity (MME), an Access and Mobility Management Function (AMF), a Session Management function (SMF)) signals a network node (e.g., router) with a downstream segment routing policy to use for downlink packet traffic between the data network and the User Equipment (with corresponding nodes in the network updated, as required, in response to a handover, including this router). In one embodiment, this network node is the same router that will decapsulate uplink data traffic from the User Equipment to the data network.

In one embodiment, this downstream segment routing policy includes an address of a segment routing and tunnel exchange to use to send the specific packet to the User Equipment. In one embodiment, this downstream segment routing policy includes an identification of a tunnel endpoint identifier (TEID), typically the same TED used for corresponding uplink traffic, and an address of the (R)AN node for communicating to the User Equipment.

By including the TEID and the address of the (R)AN node in the segment routing policy, this state information does not need to be maintained by another node (e.g., by the segment routing and tunnel exchange). In one embodiment, the TEID is encoded in a segment identifier of the segment routing policy, such as, but not limited to in an argument portion of a segment identifier (e.g., of an IPv6 address of the segment routing and tunnel exchange with the function portion invoking a convert to tunnel packet function), in a type location value of a segment routing header of the segment routing packet, etc. In one embodiment, the address of the (R)AN node and/or TEID is a segment identifier in the segment list after a particular segment identifier which is an address of the segment routing and tunnel exchange (e.g., used for reaching the segment routing and tunnel exchange).

In one embodiment, network functionalities (e.g., traffic engineering, service chaining, billing data collection, packet monitoring, lawful intercept) are identified by segment identifiers of the segment routing policy. The segment routing packet is forwarded through the network according to the ordered segment identifiers of the segment routing policy, with corresponding segment routing functions being invoked on segment routing nodes. In one embodiment, a second to last segment identifier is an address of a segment routing and tunnel exchange, with the last segment identifier being the TEID.

In the data plane for downlink traffic, a segment-routing capable network node (e.g., router) receives (directly or indirectly via another network node) the specific packet from the data network. The identity of the corresponding downlink segment routing policy is ascertained by the network node, typically via a classification operation on the specific packet (e.g., an ingress lookup operation based on the received packet). A specific segment routing packet encapsulating the received specific packet is generated and sent into the network for forwarding to the corresponding segment routing and tunnel exchange.

Based on the IPv6 destination address of a received segment routing packet, the segment routing and tunnel exchange operates according to a segment routing function to transform the segment routing packet into a specific IPv6 tunnel packet, typically by adding respective User Datagram Protocol (UDP) and GTP headers. The IP destination address of the tunnel packet will be an address of the (R)AN node communicating with the User Equipment, with this destination address and the TEID extracted from the Segment Routing Header of the received segment routing packet. In one embodiment, the TEID is acquired from the argument portion of the current segment identifier in the segment list (which is also the IP destination address) of the received segment routing packet. In one embodiment, the IP address of the (R)AN node is acquired from a segment identifier (e.g., last) after the current segment identifier in the segment list.

The specific IPv6 tunnel packet is sent to the (R)AN node, that decapsulates the specific packet therefrom, and sends to the specific packet to the User Equipment.

FIG. 1A illustrates a mobility network 100 operating according to one embodiment. In one embodiment, network 100 includes an EPC and/or 5-G user plane. Although much of the descriptions of FIGS. 1A-E and 3A-C are tailored to a network with a 5-G user plane, the teachings are directly applicable to any mobility network.

Network 100 uses a reference point representation illustrating interaction between the network function services. Although network function services may be described singularly, network 100 typically includes multiple of these network function services. In one embodiment, segment routing network 100 includes Access and Mobility Management Function (AMF) 121, Session Management Function (SMF) 122, User Equipment (UE) 131, (Radio) Access Network ((R)AN) 132, segment routing and tunnel exchange 135, segment routing-enabled (and possibly some that are not) User Plane Function (UPF) 137 (e.g., a router), and Data Network (DN) 139 (e.g., operator services, Internet access, third-party services). In one embodiment, the functions of AMF 121 and SMF 122 are performed by one or more Mobility Management Entities (MME's).

FIG. 1A also illustrates reference points of the network that include, but are not limited to: N1 (101) between UE (131) and AMF (121); N2 (102) between (R)AN (132) and AMF (121); N3 (103), that includes segment routing and tunnel exchange (135), between (R)AN (132) and UPF (137); N4 (104) between SMF (122) and UPF (137); N6 (106) between UPF (137) and Data Network (139); N9 (109) between UPFs (137); N11 (111) between AMF (121) and SMF (122); and N14 (114) between AMFs (121).

In one embodiment, network 100 provides mobility services using a segment routing data plane that spans segment routing and tunnel exchange 135 (e.g., packet switching device, router, network node) and segment routing-enabled user plane functions 137 (e.g., packet switching devices, routers, network nodes). One embodiment uses the segment routing data plane without any modification to a (radio) access network (R)AN 132 (e.g., Evolved NodeB, Next Generation NodeB) nor to user equipment 132 (e.g., any end user device).

One embodiment includes segment routing and tunnel exchange 135 in reference point N3 to exchange between tunnel packets (e.g., sent from or received by (R)AN 132) and segment routing packets (e.g., sent from or received by UPFs 137) for the uplink direction (e.g., from UE 131 to DN 139) and for the downlink direction (e.g., from DN 139 to UE 131).

Figure 1B:
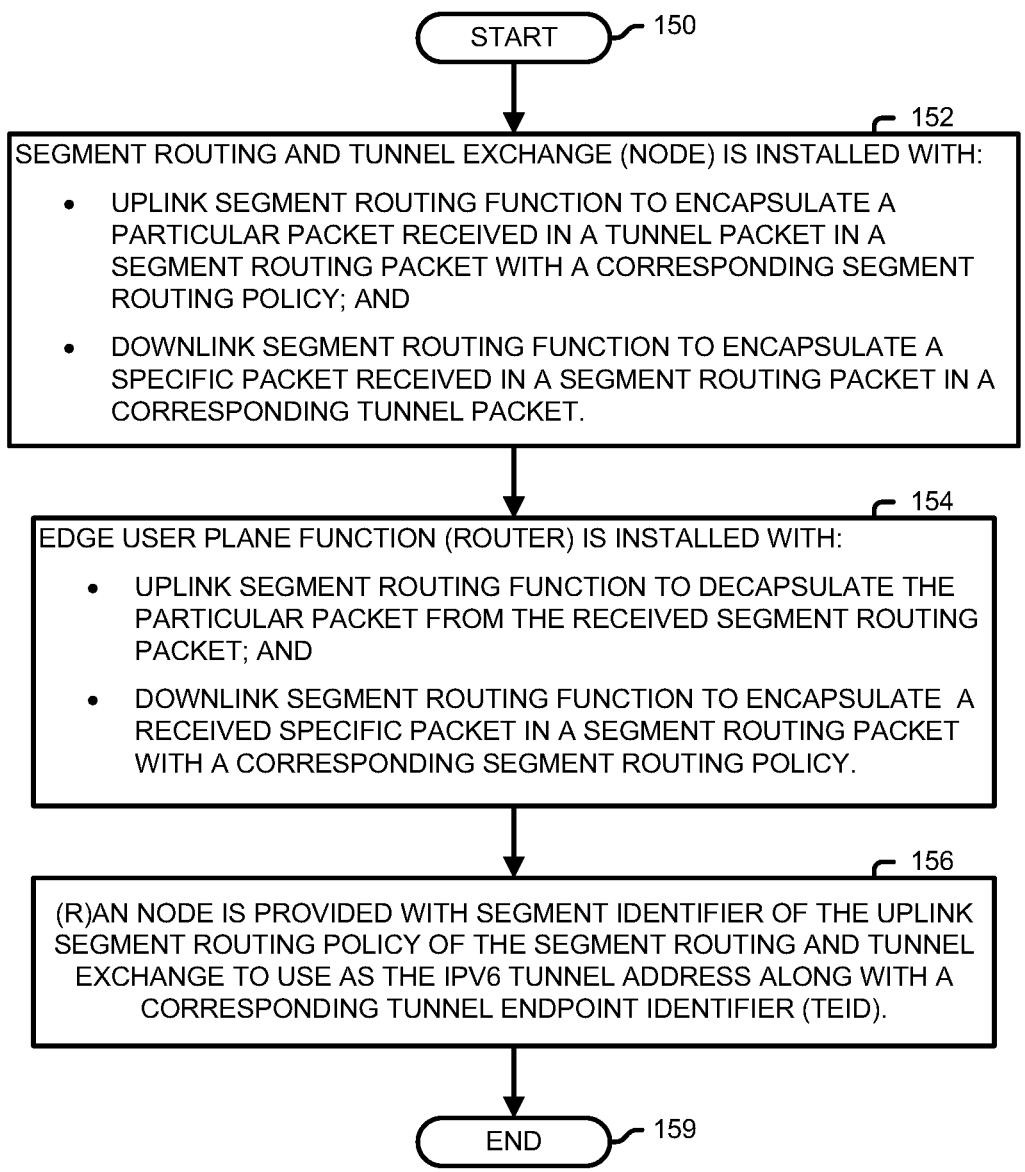
FIG. 1B illustrates a process according to one embodiment.

FIG. 1B illustrates a control plane process according to one embodiment. Processing begins with process block 150. In process block 152, the segment routing and exchange (e.g., network node, router) is installed with an uplink segment routing function and a downlink segment routing function. When operating according to (e.g., invoking) the uplink segment routing function, the segment routing and exchange will encapsulate a particular packet received in a tunnel packet (e.g., from a (R)AN) into a segment routing packet with a corresponding segment routing policy to traverse the network to arrive at an edge user plane function (e.g., segment routing-enabled router). When operating according to (e.g., invoking) the downlink segment routing function, the segment routing and exchange will encapsulate a specific packet (that was received in a segment routing packet) in a tunnel packet which is then sent (e.g., to the (R)AN).

In process block 154, the edge user plane function is installed with an uplink segment routing function and a downlink segment routing function. When operating according to (e.g., invoking) the uplink segment routing function, the edge user plane function will decapsulate a particular packet from a received segment routing packet, with the particular packet being sent from the edge user plane function (e.g., to the data network). When operating according to (e.g., invoking) the downlink segment routing function, the edge user plane function will encapsulate a received particular packet (e.g., from a data network) in a segment routing packet with a corresponding segment routing policy for reaching, as well as communicating tunnel information (e.g., a tunnel endpoint identifier and an address of a (R)AN node) to, a corresponding segment routing and tunnel exchange.

Thus, in one embodiment, the corresponding segment routing and tunnel exchange does not maintain tunnel state information, but rather, uses the tunnel information provided in a segment routing packet (e.g., by one or more segment identifiers in a segment list in a segment routing header) in generating the specific tunnel packet.

In one embodiment, the edge user plane function receives from a session management function (or mobility management entity) the segment routing policies to use for corresponding classifications of received specific packets. In one embodiment, a lookup key (e.g., in the form of an IP address) is provided by the session management function (or mobility management entity) to the user plane function for each different packet classification. In response to providing the lookup key to a network node or function (e.g., path computation engine, a database server, LISP server, DNS server, web server), the edge user plane function receives the corresponding segment routing policy.

In process block 156, an access and mobility function provides to the (R)AN node currently associated with the user equipment, the core network tunnel information that includes a tunnel endpoint identifier (e.g., a TEID of GPRS Tunneling Protocol for the user plane/GTP-U) and a segment identifier of the uplink segment routing policy on the segment routing and tunnel exchange. In one embodiment, the access and mobility function causes different sessions (e.g., identified by different tunnel endpoint identifiers) of the user equipment to use a same segment routing policy by providing a same segment identifier for each of these different tunnel endpoint identifiers.

Processing of the flow diagram of FIG. 1B is complete as indicated by process block 159.

Figure 1C:
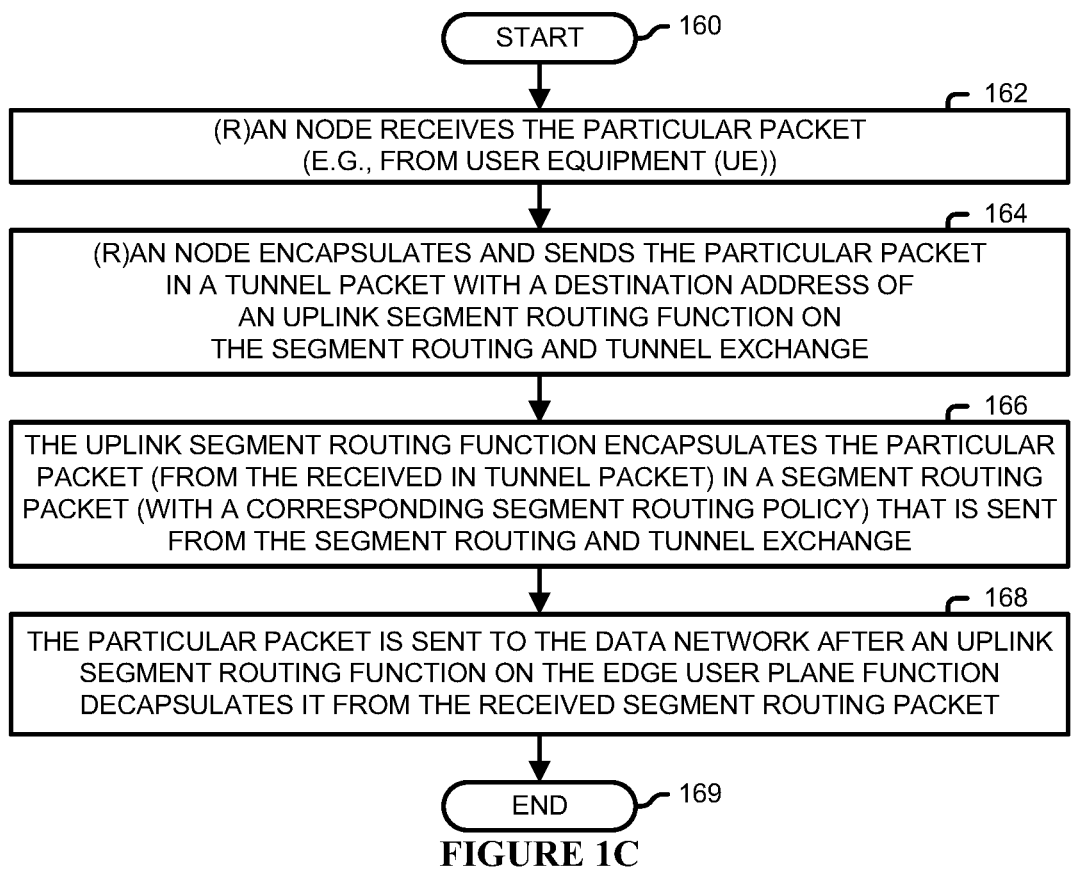
FIG. 1C illustrates a process according to one embodiment.

FIG. 1C illustrates one embodiment of a data plane process used in sending uplink traffic in the network, that includes communicating a particular packet from a (R)AN node to a data network. Processing begins with process block 160.

In process block 162, the (R)AN node receives the particular packet from the user equipment. In process block 164, the (R)AN node encapsulates the particular packet in a tunnel packet with a destination address (e.g., segment identifier) of the assigned uplink segment routing policy on the segment routing and tunnel exchange. This tunnel packet is sent from the (R)AN node to the segment routing and tunnel exchange.

In process block 166, the segment routing and tunnel exchange, operating according to its uplink segment routing function, encapsulates the particular packet (that is in the received tunnel packet) into a segment routing packet with the corresponding segment routing policy, with this segment routing packet being sent.

In process block 168, the edge user plane function (e.g., segment routing-enabled router), operating according to its uplink segment routing function, decapsulates the particular packet from the received segment routing packet, and sends the particular packet (e.g., to the data network).

Processing of the flow diagram of FIG. 1C is complete as indicated by process block 169.

Figure 1D:
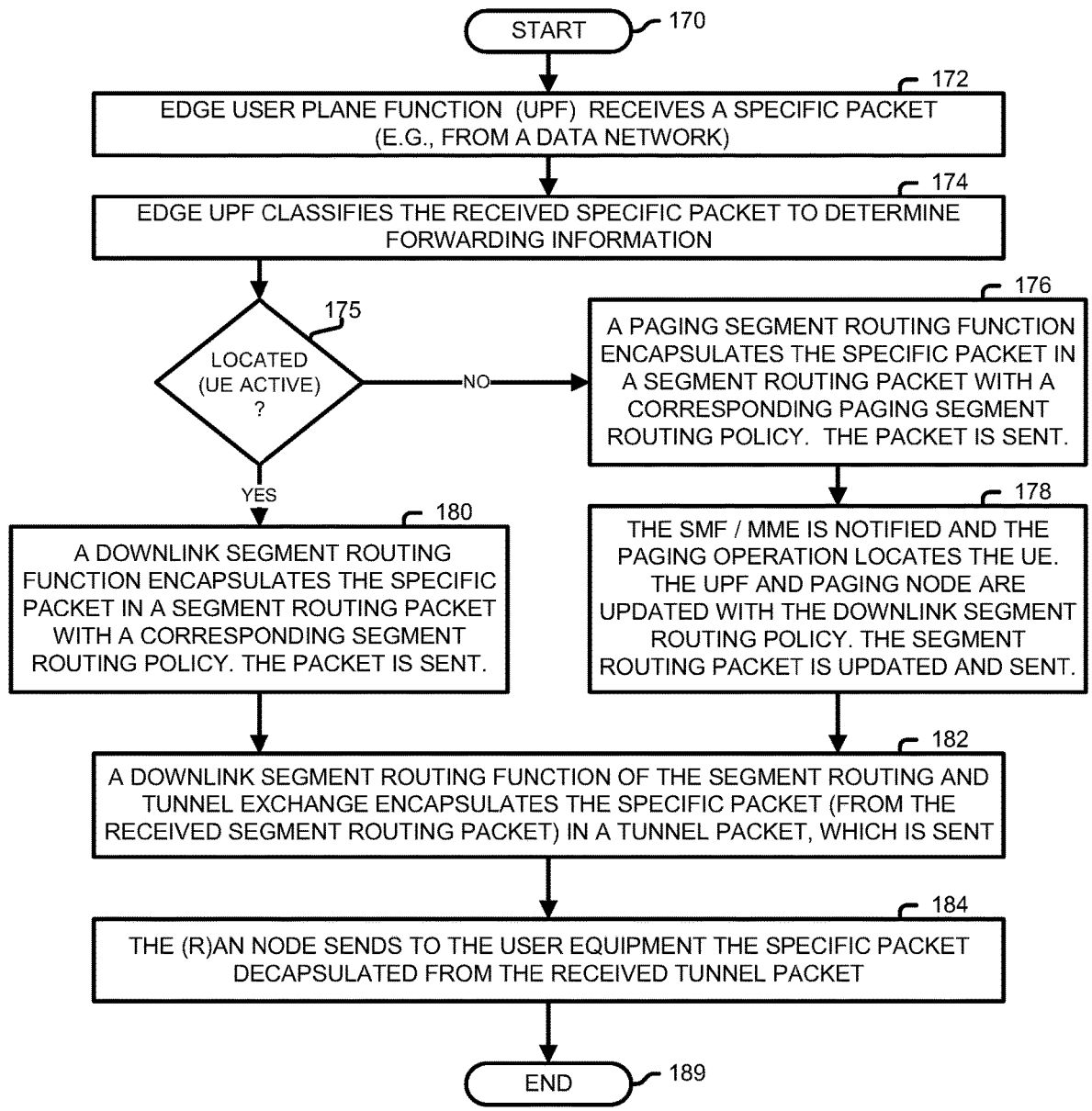
FIG. 1D illustrates a process according to one embodiment.

FIG. 1D illustrates one embodiment of a data plane process used in sending downlink traffic, that includes communicating a specific packet from a data network to a (R)AN node. Processing begins with process block 170.

In process block 172, the edge user plane function (e.g., segment routing-enabled router) receives a specific packet from the data network. In process block 174, the edge user plane function, performs a packet classification operation on the specific packet to determine forwarding information to reach the corresponding user equipment. As determined in process block 175, if the downlink segment routing policy is programmed (e.g., the user equipment is active/not in an idle state), then processing proceeds to process block 180; otherwise processing proceeds to process block 176.

Continuing with process block 176 as the user equipment is in an idle state (e.g., ECM-IDLE state), a paging routing segment function on the edge user plane function encapsulates the specific packet in a paging segment routing packet with a paging segment routing policy, with the paging segment routing packet being communicated to a paging node (e.g., a segment routing-enable router in the network). In one embodiment, the paging node is the same edge user plane function. In one embodiment, the paging node is a router different than the edge user plane function. In one embodiment, the paging segment routing policy (e.g., per the ordered segment identifiers in a segment routing header) includes sending the paging segment routing packet through one or more carrier service functions (e.g., billing data collection, packet monitoring) before reaching the paging node in parallel with performing the processing of process block 178.

In process block 178, the session management function (SMF) or mobility management entity (MME) is notified, and a paging operation locates the user equipment. The session management function (SMF) or mobility management entity (MME) performs operations, including providing to (1) the edge user plane function the downstream segment routing policy to use for future specific packets and (2) providing the paging node with a paging downstream segment routing policy (possibly the same policy) to use for the communicating the received segment routing packet to the segment routing and tunnel exchange. The segment routing packet is updated according to the paging downstream segment routing policy, and is sent from the paging node. Processing proceeds to process block 182. In case of timeout, appropriate timeout processing is performed in process block 178.

Continuing with process block 180 (as the forwarding information was located as determined in process block 175), the edge user plane function (operating according to its downlink segment routing function) encapsulates the specific packet in a segment routing packet specifying the downlink segment routing policy. The segment routing policy comprises segment identifiers for steering the segment routing packet through the network to the segment routing and tunnel exchange. The segment routing policy also comprises core network tunnel information that includes a tunnel endpoint identifier (e.g., a TED of GPRS Tunneling Protocol for the user plane/GTP-U) and an address of the destination (R)AN node. The core network tunnel information is typically encoded in a segment routing header of the segment routing packet, such as, but not limited to, among one or more segment identifiers that may (or may not) also be used in steering the segment routing packet to the segment routing and tunnel exchange. The segment routing packet is sent from the edge user plane function and subsequently received by the segment routing and tunnel exchange. Processing proceeds to process block 182.

Continuing with process block 182, the segment routing and tunnel exchange, operating according to the downlink segment routing function, encapsulates the specific packet (from the received segment routing packet) in a tunnel packet that includes corresponding tunnel information (e.g., identification of the tunnel endpoint, and address of the specific (R)AN node communicating with the user equipment) for communicating the tunnel packet to the specific (R)AN node.

In process block 184, the (R)AN node decapsulates the specific packet from the received tunnel packet, identifies the User Equipment (e.g., based on the TEID), and sends the specific packet to the User Equipment.

Processing of the flow diagram of FIG. 1D is complete as indicated by process block 189.

Figure 1E:
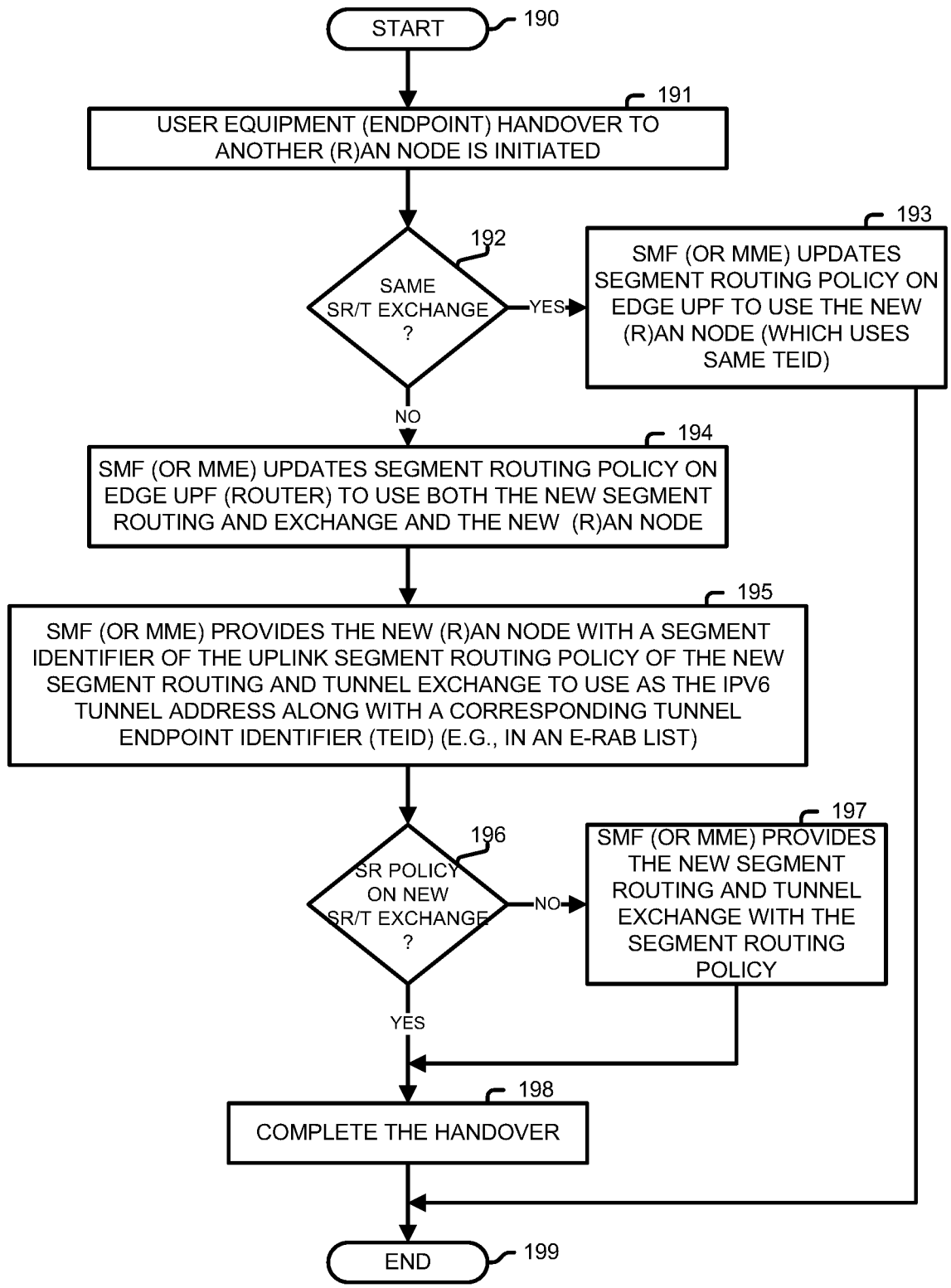
FIG. 1E illustrates a process according to one embodiment.

FIG. 1E illustrates a control plane process managing a portion (e.g., related to using the segment routing and tunnel exchange) of the user equipment (endpoint) handover according to one embodiment. Processing begins with process block 190.

In process block 191, the user equipment (endpoint) handoff to another (R)AN node is initiated. As determined in process block 192, if the same segment routing and tunnel exchange will be used, then processing proceeds to process block 193, else processing proceeds to process block 194.

Continuing in process block 193, the session management function (or mobility management entity) updates the segment routing policy on the edge user plane function (e.g., segment routing-enabled router) to use the new (R)AN node (e.g., modify address of the (R)AN node in the tunnel information being communicated in the segment routing header of a segment routing packet). In one embodiment, the same TEID is used. Processing proceeds to process block 199.

Continuing in process block 194, the session management function (or mobility management entity) updates the segment routing policy on the edge user plane function to use both the new segment routing and tunnel exchange and the new (R)AN node (e.g., modify the forwarding policy to reach the new segment routing and tunnel exchange and modify the address of the (R)AN node in the tunnel information being communicated in the segment routing header of a segment routing packet). In one embodiment, the same TEID is used.

In process block 195, a segment management function (or mobility management entity) provides to the new (R)AN node, the core network tunnel information that includes a tunnel endpoint identifier (e.g., a TEID of GPRS Tunneling Protocol for the user plane/GTP-U) and an IP address of the new segment routing and tunnel exchange (e.g., which is also a segment identifier of the uplink segment routing policy on the new segment routing and tunnel exchange). In one embodiment, the segment management function (or mobility management entity) causes different sessions (e.g., identified by different tunnel endpoint identifiers) of the user equipment to use a same segment routing policy by providing a same segment identifier (e.g., destination IP address) for each of these different tunnel endpoint identifiers.

As determined in process block 196, if the segment routing policy already exists on the new segment routing and tunnel exchange, then processing proceeds directly to process block 198; otherwise processing proceeds to process block 198 after process block 197, wherein the session management function (or mobility management entity) provides the new segment routing and tunnel exchange with the segment routing policy.

Continuing in process block 198, the handover is completed (e.g., User Equipment signaled) so that the User Equipment communicates through the new (R)AN node, and through a same or different segment routing and tunnel exchange.

Processing of the flow diagram of FIG. 1E is complete as indicated by process block 199.

Figure 2A:
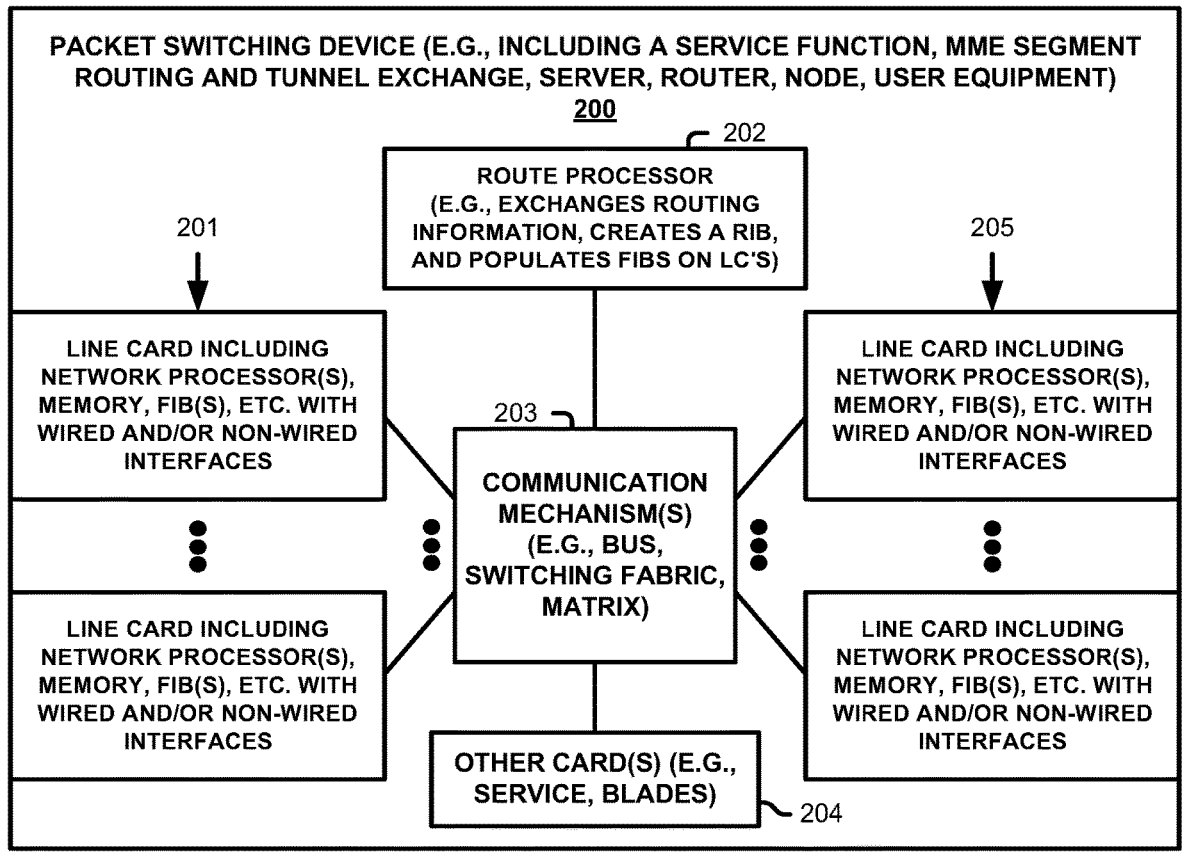
FIG. 2A illustrates a packet switching device according to one embodiment.
Figure 2B:
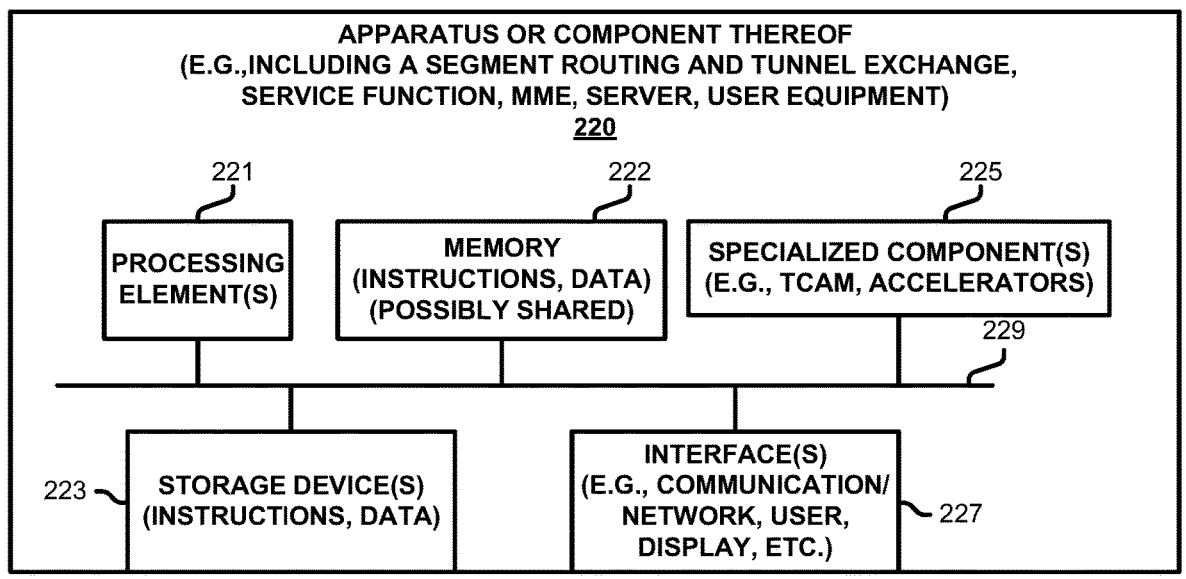
FIG. 2B illustrates an apparatus according to one embodiment.

FIGS. 2A-B and their discussion herein provide a description of various SR network nodes according to one embodiment.

FIG. 2A illustrates one embodiment of a segment routing-enabled packet switching device 200 (e.g., segment routing and tunnel exchange, service function, mobility management entity, appliance, router, node, host, end node, user equipment) according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with packet communications including using a segment routing and tunnel exchange in a network. Packet switching device 200 also has a control plane with one or more processing elements 202 for managing the control plane and/or control plane processing of packets associated with packet communications including using a segment routing and tunnel exchange in a network. Packet switching device 200 also includes other cards 204 (e.g., service cards, blades) which include processing elements that are used in one embodiment to process (e.g., forward/send, drop, manipulate, change, modify, receive, create, duplicate, perform segment routing functions, wired and/or non-wired interfaces for sending and receiving packets and/or other information) packets associated with packet communications including using a segment routing and tunnel exchange in a network, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, SR gateway and segment routing functions are implemented on a line card 201, 205.

FIG. 2B is a block diagram of an apparatus (or component thereof) 220 (e.g., a segment routing and tunnel exchange, service function, mobility management entity, server, user equipment) used in one embodiment associated with packet communications including using a segment routing and tunnel exchange in a network. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup and/or packet processing operations, segment routing functions, segment routing and tunnel exchange functions, mobility management entity and/or service functions, associative memory, binary and/or ternary content-addressable memory, etc.), and wired and/or non-wired interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
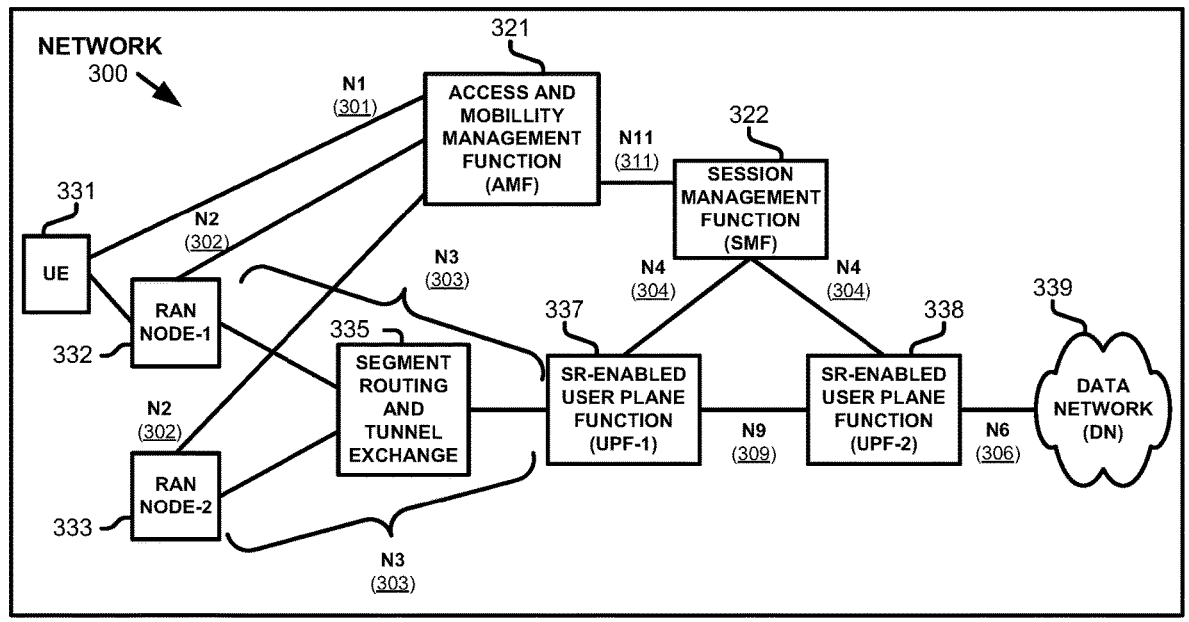
FIG. 3A illustrates a network operating according to one embodiment.

FIG. 3A illustrates a mobility 300 operating according to one embodiment. In one embodiment, network 300 includes an Evolved Packet Core (EPC) and/or 5-G user plane. Although much of the descriptions of FIGS. 1A-E and 3A-C are tailored to a network with a 5-G user plane, the teachings are directly applicable to any mobility network Network 300 uses a reference point representation illustrating interaction between the network function services. Although network function services may be described singularly, network 300 typically includes multiple of these network function services. In one embodiment, segment routing network 300 includes Access and Mobility Management Function (AMF) 321, Session Management Function (SMF) 322, User Equipment (UE) 331, Radio Access Network RAN) nodes 332 and 333, segment routing and tunnel exchange 335, segment routing-enabled (and possibly some that are not) User Plane Functions (UPFs) 337 and 338, and Data Network (DN) 339 (e.g., operator services, Internet access, third-party services). In one embodiment, the functions of AMF 321 and SMF 322 are performed by one or more Mobility Management Entities (MME's).

FIG. 3A also illustrates reference points of the network that include, but are not limited to: N1 (301) between UE (331) and AMF (321); N2 (302) between each (R)AN node (332, 333) and AMF (321); N3 (303), that includes segment routing and tunnel exchange (335), between each (R)AN node (332, 333) and UPF (337); N4 (304) between SMF (322) and each UPF (337, 338); N6 (306) between UPF (338) and Data Network (339); N9 (309) between UPFs (337, 338); and N11 (311) between AMF (321) and SMF (322).

In one embodiment, network 300 provides mobility services using a segment routing data plane that spans segment routing and tunnel exchange 335 (e.g., segment routing enabled router or network node) and segment routing-enabled user plane functions 337, 338 (e.g., packet switching devices, routers, network nodes). One embodiment uses the segment routing data plane without any modification to a radio access network RAN node 332, 333 (e.g., Evolved NodeB, Next Generation NodeB) nor user equipment 332 (e.g., any end user device).

One embodiment includes segment routing and tunnel exchange 335 in reference point N3 to exchange between tunnel packets (e.g., sent from or received by a (R)AN 332, 333) and segment routing packets (e.g., sent from or received by UPF 337) in the uplink direction (e.g., from UE 331 to DN 339) and in the downlink direction (e.g., from DN 339 to UE 331).

Figure 3B:
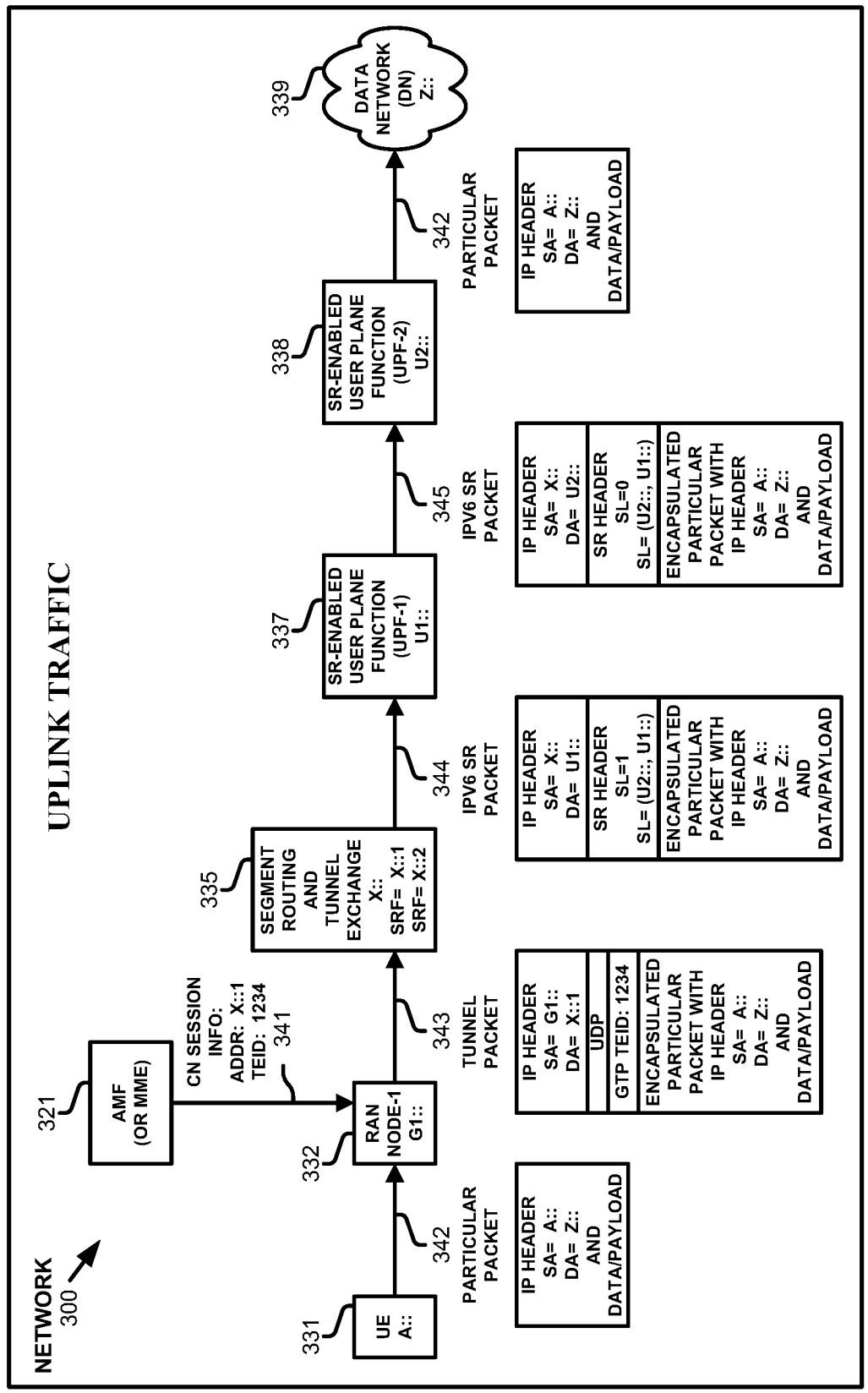
FIG. 3B illustrates a network operating according to one embodiment.

FIG. 3B illustrates mobility network 300 operating according to one embodiment, including to communicate uplink traffic between user equipment 331 and data network 339. Access and management mobility function (or mobility management entity) (321) provides RAN node-1 (332) with core network tunnel information of an IPv6 tunnel address of X::1, and a tunnel endpoint identifier (TED) 1234.

User equipment (331), having an IPv6 address of A::, sends particular packet 342 to RAN node-1 (332). Particular packet 342 includes an IP header with a source address of A:: and a destination address of Z:: (an address in data network 339), and includes a data/payload.

Using the core network tunnel information and in response to receiving particular packet 342, RAN node-1 (332) encapsulates particular packet 342 in particular tunnel packet 343 (e.g., using GPRS Tunneling Protocol for the user plane/GTP-U) with a source address of G1:: (an address of RAN node-1 332), and a destination address of the programmed tunnel address X::1 (an address of segment routing and tunnel exchange 335). RAN node-1 (332) then sends particular tunnel packet 343, which is forwarded based on its destination address.

Segment routing and tunnel exchange 335 receives particular tunnel packet 343. As address X::1 corresponds to an uplink segment routing policy (e.g., address X::1 is a binding segment identifier), segment routing and tunnel exchange 335 operates accordingly and generates particular segment routing packet 344 encapsulating particular packet 342. According to the uplink segment routing policy, the segment routing packet is to be steered through network 300 via segment routing-enabled user plane function 337 and then to segment routing-enabled user plane function 338 as reflected by the ordered segment identifiers in the segment list in segment routing header of packet 344. Particular segment routing packet 344 is sent from segment routing and tunnel exchange 335.

User plane function UPF-1 (337) receives particular segment routing packet 344, and performs the corresponding segment routing processing, including updating its segment routing header as reflected as particular segment routing packet 345, which is sent from user plane function UPF-1 (337).

User plane function UPF-2 (338) receives particular segment routing packet 345, and performs the corresponding segment routing processing, including decapsulating particular packet 342, which is sent from user plane function UPF-2 (338).

Data network 339 receives particular packet 342, and forwards it based on its destination address.

Figure 3C:
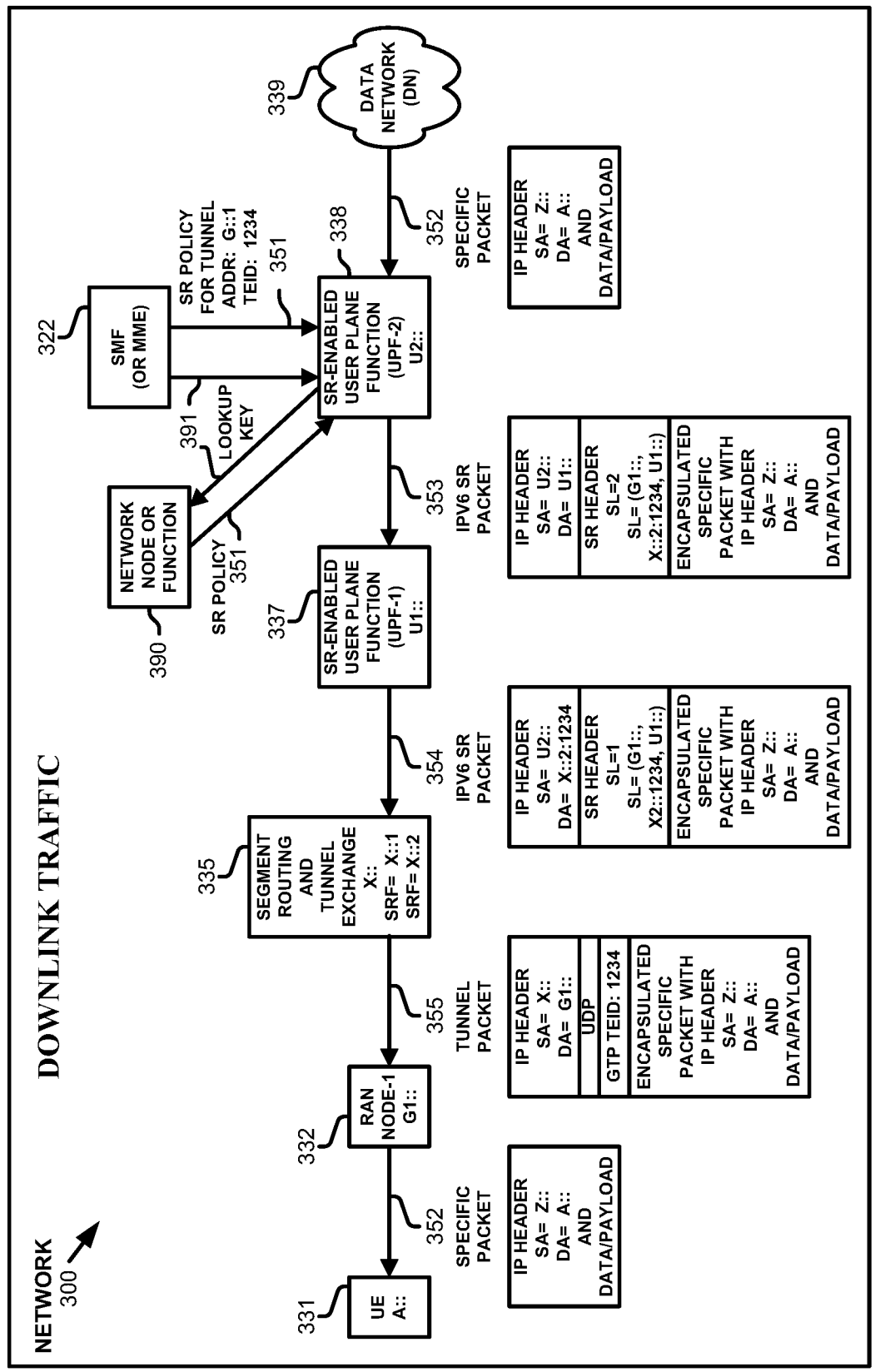
FIG. 3C illustrates a network operating according to one embodiment.

FIG. 3C illustrates mobility network 300 operating according to one embodiment, including to communicate downlink traffic between data network 339 and user equipment 331.

In one embodiment, session management function (or mobility management entity) 322 provides segment routing-enabled user plane function UPF-2 (338) with downlink segment routing policy (351) that includes tunnel information of a tunnel address of G::1, and a tunnel identifier of 1234.

In one embodiment, session management function (or mobility management entity) 322 provides segment routing-enabled user plane function UPF-2 (338) with a lookup key (391) (e.g., in the form of an IP address). User plane function UPF-2 (338) provides the lookup key (391) to network node or function (390) (e.g., path computation engine, a database server, LISP server, DNS server, web server) based on which it provides to user plane function UPF-2 (338) downlink segment routing policy (351) that includes tunnel information of a tunnel address of G::1, and a tunnel identifier of 1234.

User plane function UPF-2 (338) receives specific packet 352 from data network 339, and then classifies specific packet 352 to identify downlink segment routing policy (351). Operating according to this downlink segment routing policy, user plane function UPF-2 (338) encapsulates specific packet 352 in specific segment routing packet 353 that is to be forwarded through user plane function UPF-1 337 and then to tunnel and segment routing exchange 335.

Figure 3D:
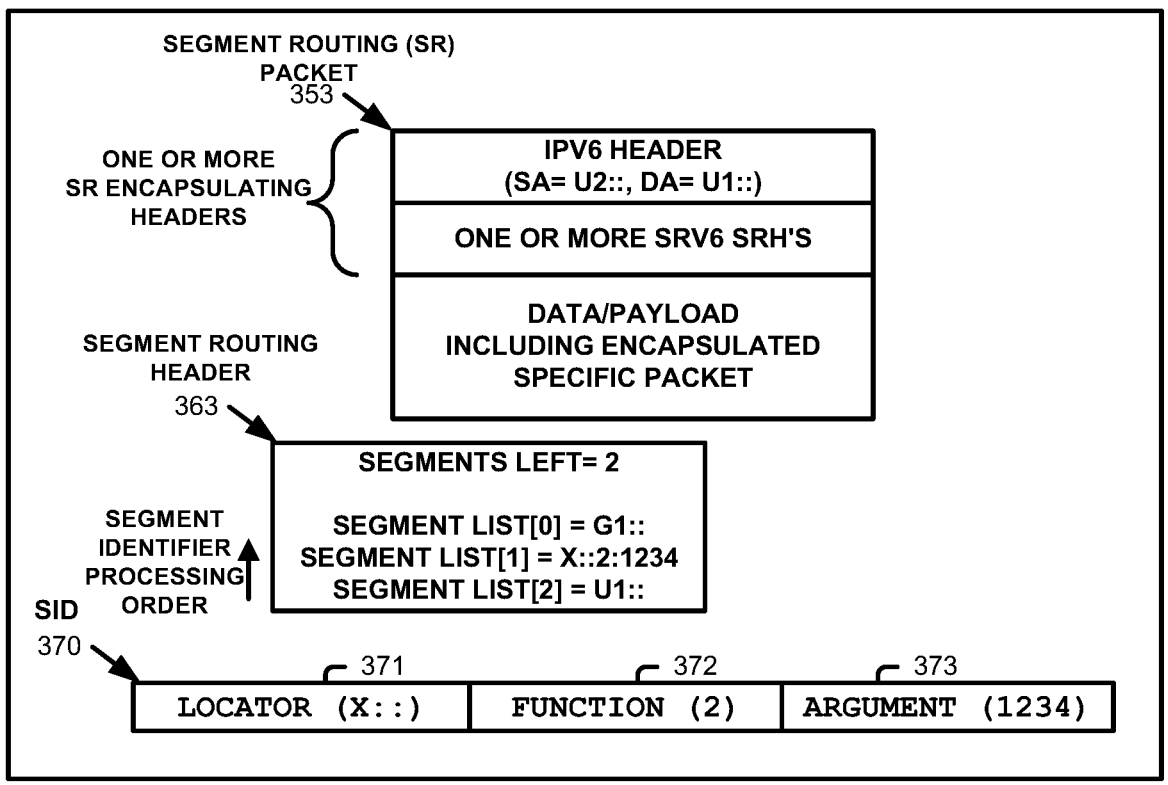
FIG. 3D illustrates a segment routing packet according to one embodiment.

Referring to FIG. 3D, specific segment routing packet 353 includes an IPv6 header, one or more encapsulating segment routing headers, and data payload encapsulating specific packet 352. Segment routing header 363 of specific segment routing packet 353 includes a segments left value of 2, and a segment list of ordered segment identifiers U1::, then X::2:1234 (segment identifier 370), then G1::. Segment identifier 370 is shown in more detail identifying a locator value (X::) 371, segment routing function (2) 372, and argument (1234) 373. In one embodiment, argument 373 includes tunnel endpoint identifier (1234) of the provided tunnel information, and the segment identifier at segment list[0] of segment routing header 363 is set to G1::, which is the tunnel address (e.g., an IP address of RAN Node-1 332 of FIG. 3C) the provided tunnel information.

In this manner, core network tunnel state information is maintained by a downlink segment routing policy of user plane function UPF-2 (338), and included in a specific segment routing packet that will be processed by segment routing and tunnel exchange 335 according to this core network tunnel state information. Thus, in one embodiment, segment routing and tunnel exchange 335 only maintains this core network tunnel state information for long enough to process the specific segment routing packet.

Referring back to FIG. 3C, specific segment routing packet 353 is sent from user plane function UP-2 (338).

User plane function UPF-1 (337) receives specific segment routing packet 353, and performs the corresponding segment routing processing, including updating its segment routing header as reflected as specific segment routing packet 354, which is sent from user plane function UPF-1 (337).

Segment routing and tunnel exchange 335 receives specific segment routing packet 354, which invokes a corresponding downlink segment routing function based on its destination address/current segment identifier in the segment list. Operating in accordance with this downlink segment routing function, segment routing and tunnel exchange 335 generates specific tunnel packet 355 (e.g., using GPRS Tunneling Protocol for the user plane/GTP-U) encapsulating specific packet 352. Specific tunnel packet 355 includes one or more headers comprising an IP destination address of the next segment identifier (e.g., at segment list[0]), and with a tunnel endpoint identifier obtained from the argument of the current segment identifier (X:2:1234) of specific segment routing packet 354 as received. Specific tunnel packet 355 is sent from segment routing and tunnel exchange 335.

RAN node-1 (332) receives specific tunnel packet 355, decapsulates and sends specific packet 352 to user equipment 331 as it corresponds to tunnel identifier 1234 included in a header of specific tunnel packet 355.

User equipment 331 receives and processes specific packet 352.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof

The invention claimed is:

1. A method comprising
receiving, at a network node, an Internet Protocol Version 6 (IPv6) packet transmitted from a node of a radio access network (RAN),
wherein the IPv6 packet comprises a first IPv6 header and a tunneling protocol header, the first IPv6 header comprising a destination address, the destination address comprising a binding segment identifier (SID), and the tunneling protocol header comprising a tunnel endpoint identifier,
wherein the IPv6 packet encapsulates a session packet transmitted by a user equipment (UE) node;
modifying the IPv6 packet by:
removing the first IPv6 header and the tunneling protocol header; and
adding a second IPv6 header, the second IPv6 header comprising a segment routing header comprising a segment list associated with the binding SID,
wherein the segment list comprises one or more SIDs,
wherein a SID of the one or more SIDs in the segment list corresponds to a user plane function (UPF) node; and
transmitting the modified IPv6 packet from the network node.

2. The method of claim 1, wherein the SID corresponding to the UPF node is a binding SID operative to cause the UPF node to decapsulate the session packet and forward the session packet to a data network.

3. The method of claim 2, wherein the binding SID corresponding to the UPF node includes the tunnel endpoint identifier.

4. The method of claim 1, wherein a second SID of the one or more SIDs in the segment list corresponds to a node in a packet core network.

5. The method of claim 1, wherein the binding SID is associated with a plurality of user equipment sessions.

6. The method of claim 1, wherein the modified IPv6 packet is transmitted from the network node to a second network node prior to being transmitted to the UPF node.

7. The method of claim 1, further comprising
receiving a second IPv6 packet transmitted from the UPF node,
wherein the second IPv6 packet comprises a third IPv6 header, the third IPv6 header comprising a second destination address, the second destination address comprising a second binding segment identifier (SID),
wherein the second binding SID encodes the tunnel endpoint identifier, and
wherein the second IPv6 packet encapsulates a second session packet transmitted to the user equipment (UE) node;
generating a tunnel packet based on the second IPv6 packet by encapsulating the second session packet with a second tunnelling protocol header including the tunnel endpoint identifier and a fourth IPv6 header including a third destination address identifying the node of the RAN; and
transmitting the tunnel packet to the node of the RAN.

8. The method of claim 7, wherein the second IPv6 packet comprises a second segment routing header including a segment identifier associated with the node of the RAN.

9. The method of claim 8, wherein generating the tunnel packet further comprises removing the third IPv6 header and the second segment routing header from the second IPv6 packet.

10. The method of claim 7, wherein generating the tunnel packet further comprises encapsulating the second session packet with a user datagram protocol header.

11. An apparatus, comprising:
one or more hardware interfaces sending and receiving packets in a network; and
one or more network processors with memory associated therewith,
the apparatus performs operations including:
receiving an Internet Protocol Version 6 (IPv6) packet transmitted from a node of a radio access network (RAN),
wherein the IPv6 packet comprises a first IPv6 header and a tunneling protocol header,
the first IPv6 header comprising a destination address,
the destination address comprising a binding segment identifier (SID), and
the tunneling protocol header comprising a tunnel endpoint identifier,
wherein the IPv6 packet encapsulates a session packet transmitted by a user equipment (UE) node;
modifying the IPv6 packet by:
removing the first IPv6 header and the tunneling protocol header;
and
adding a second IPv6 header, the second IPv6 header comprising a segment routing header comprising a segment list associated with the binding SID,
wherein the segment list comprises one or more SIDs,
wherein a SID of the one or more SIDs in the segment list corresponds to a user plane function (UPF) node; and
transmitting the modified IPv6 packet from the network node.

12. The apparatus of claim 11, wherein the SID corresponding to the UPF node is a binding SID operative to cause the UPF node to decapsulate the session packet and forward the session packet to a data network.

13. The apparatus of claim 12, wherein the binding SID corresponding to the UPF node includes the tunnel endpoint identifier.

14. The apparatus of claim 11, wherein a second SID of the one or more SIDs in the segment list corresponds to a node in a packet core network.

15. The apparatus of claim 11, wherein the binding SID is associated with a plurality of user equipment sessions.

16. The apparatus of claim 11, wherein the modified IPv6 packet is transmitted from the network node to a second network node prior to being transmitted to the UPF node.

17. The apparatus of claim 11 wherein said operations include:
receiving a second IPv6 packet transmitted from the UPF node, wherein the second IPv6 packet comprises a third IPv6 header,
wherein the third IPv6 header comprising a second destination address, the second destination address comprising a second binding segment identifier (SID),
wherein the second binding SID encodes the tunnel endpoint identifier, and
wherein the second IPv6 packet encapsulates a second session packet transmitted to the user equipment (UE) node;
generating a tunnel packet based on the second IPv6 packet by encapsulating the second session packet with a second tunnelling protocol header including the tunnel endpoint identifier and a fourth IPv6 header including a third destination address identifying the node of the RAN; and
transmitting the tunnel packet to the node of the RAN.

18. The apparatus of claim 17, wherein the second IPv6 packet comprises a second segment routing header including a segment identifier associated with the node of the RAN.

19. The apparatus of claim 18, wherein generating the tunnel packet further comprises removing the third IPv6 header and the second segment routing header from the second IPv6 packet.

20. The apparatus of claim 17, wherein generating the tunnel packet further comprises encapsulating the second session packet with a user datagram protocol header.

* * * * *